(12) United States Patent
Asanuma

(10) Patent No.: US 6,666,981 B2
(45) Date of Patent: Dec. 23, 2003

(54) METHOD OF FORMING PATTERNED THIN FILM AND METHOD OF FORMING MAGNETIC POLE OF THIN-FILM MAGNETIC HEAD

(75) Inventor: Yuji Asanuma, Chuo-Ku (JP)

(73) Assignee: TDK Corporation, Tokyo (JP)

( * ) Notice: Subject to any disclaimer, the term of this patent is extended or adjusted under 35 U.S.C. 154(b) by 342 days.

(21) Appl. No.: 09/921,581

(22) Filed: Aug. 6, 2001

(65) Prior Publication Data

US 2002/0031727 A1 Mar. 14, 2002

(30) Foreign Application Priority Data

Aug. 18, 2000 (JP) .......................... 2000-248465

(51) Int. Cl.$^7$ .............................. B44C 1/22; G03C 5/00
(52) U.S. Cl. .......................................... 216/22; 430/313
(58) Field of Search ........................... 216/22; 29/602.1, 29/603.01, 603.07, 603.12, 603.15, 603.16, 603.18; 338/32 R; 438/3; 430/313, 314, 319

(56) References Cited

U.S. PATENT DOCUMENTS 5,438,747 A   8/1995   Krounbi et al.
6,350,556 B1 * 2/2002  Asanuma .................... 430/313

FOREIGN PATENT DOCUMENTS

JP         A 7-262519        10/1995
JP         A 2000-20914      1/2000

* cited by examiner

*Primary Examiner*—Gregory Mills
*Assistant Examiner*—Roberts P. Culbert
(74) *Attorney, Agent, or Firm*—Oliff & Berridge, PLC

(57) ABSTRACT

A method of forming a patterned thin film and a method of forming a magnetic pole of a thin-film magnetic head according to the invention comprise the steps of: forming a convex first patterned layer made of a first material on an electrode film that serves as a conductive base; forming a second patterned layer to be a frame, made of a nonconductive second material different from the first material, on the electrode film around the first patterned layer; making the second patterned layer into a frame by removing the first patterned layer, the frame having a groove formed by the removal of the first patterned layer; and forming a patterned thin film (pole portion layer) in the groove of the frame.

13 Claims, 6 Drawing Sheets

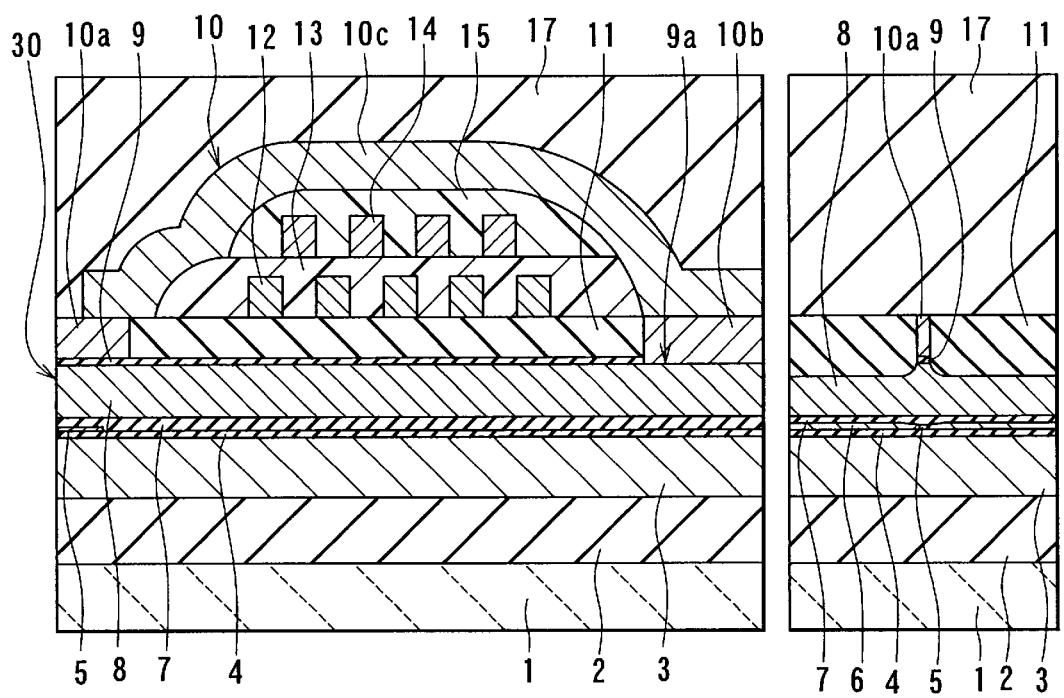
FIG. 4A                    FIG. 4B

METHOD OF FORMING PATTERNED THIN FILM AND METHOD OF FORMING MAGNETIC POLE OF THIN-FILM MAGNETIC HEAD

BACKGROUND OF THE INVENTION

1. Field of the Invention

The present invention relates to a method of forming a patterned thin film, and to a method of forming a magnetic pole of a thin-film magnetic head by using the method of forming a patterned thin film.

2. Description of the Related Art

Performance improvements in thin-film magnetic heads have been sought as areal recording density of hard disk drives has increased. Such thin-film magnetic heads include composite thin-film magnetic heads that have been widely used. A composite head is made of a layered structure including a write (recording) head having an induction-type electromagnetic transducer for writing and a read (reproducing) head having a magnetoresistive (MR) element for reading.

The write head comprises a bottom pole layer, a top pole layer, a write gap layer, and a thin-film coil. The bottom and top pole layers include pole portions that are opposed to each other and placed in regions on a side of an air bearing surface. The write gap layer is provided between the pole portion of the bottom pole layer and the pole portion of the top pole layer. The thin-film coil is arranged such that at least a part thereof is insulated from the bottom pole layer and the top pole layer.

It is required to increase the track density on a magnetic recording medium in order to increase recording density among the performance characteristics of a write head. To achieve this, it is required to implement a write head of a narrow track structure wherein the width of the pole portions of the bottom and top pole layers on a side of the air bearing surface, that is a write track width, is reduced down to microns or the order of submicron. Semiconductor process techniques are utilized to implement such a structure.

As disclosed in Published Unexamined Japanese Patent Application (KOKAI) No. Hei 7-262519, for example, frame plating may be used as a method of fabricating magnetic poles that define the track width. In this method, an electrode film is formed on a base, and a resist layer is formed on the electrode film. The resist layer is patterned through a photolithography process to form a frame to be used for plating. Then, this frame is used to perform plating with the previously formed electrode film as a seed layer. A patterned plating layer is thereby formed.

As described above, it is desired to achieve a thin-film magnetic head having a write head with a small track width. Therefore, in forming magnetic poles by frame plating, the widths of the magnetic poles are reduced by means of sophisticated resists, shorter wavelengths of exposure light, and the like.

According to the prior-art method of frame plating, however, because the resist layer is patterned using optical measures and the frame thereby obtained is used to form the patterned plating layer, it is theoretically impossible to form a patterned plating layer finer than the dimensions determined by optical limitations. Consequently, it is also impossible, by means of the frame plating, to form a magnetic pole finer than the dimensions determined by optical limitations.

As disclosed in Published Unexamined Japanese Patent Application (KOKAI) No. 2000-20914, the present inventor has proposed a technique for forming a fine metal film. This technique comprises the steps of: forming a first resist frame in a pattern corresponding to that of the metal film to be formed, on a base having conductivity at least across its surface; attaching a metal plating film to around this first resist frame by electro-plating; removing the first resist frame while leaving the metal plating film unremoved; and forming the metal film inside a groove in a patterned layer obtained through the removal of the first resist frame.

According to the above-described technique, when the metal film is to be formed through plating, a second resist frame is desirably formed to cover the patterned layer obtained through the removal of the first resist frame, before the formation of the metal film. The reason is that the patterned layer obtained through the removal of the first resist frame is made of metal and therefore, without the second resist frame, the metal film can be formed not only inside the groove in the patterned layer but also over the patterned layer.

Thus, the above-described technique necessitates the frame of two-layered structure when forming the metal film by plating, which results in an increase in the number of steps required for the metal film formation. The technique is therefore susceptible of improvement.

OBJECT AND SUMMARY OF THE INVENTION

It is an object of the invention to provide a method of forming a patterned thin film capable of forming patterned thin films finer than the dimensions determined by optical limitations, and a method of forming a magnetic pole of a thin-film magnetic head capable of forming magnetic poles finer than the dimensions determined by optical limitations, through the use of the method of forming a patterned thin film.

A method of forming a patterned thin film according to the invention is provided for forming a patterned thin film by using a frame, and comprises the steps of: forming a convex first patterned layer made of a first material on a conductive base; forming a second patterned layer to be a frame on the base around the first patterned layer, the second patterned layer being made of a nonconductive second material that is different from the first material; making the second patterned layer into the frame by removing the first patterned layer, the frame having a groove formed by the removal of the first patterned layer; and forming a patterned thin film in the groove of the frame.

According to the method of forming a patterned thin film of the invention, it is possible to form the groove of the frame finely by forming the convex first patterned layer finely. The method therefore allows a fine formation of the patterned thin film in the groove.

In the method of forming a patterned thin film of the invention, plating may be used in the step of forming the patterned thin film.

In the method of forming a patterned thin film of the invention, the step of forming the second patterned layer may include the steps of: forming a covering film made of the second material so as to cover the first patterned layer; and making the covering film into the second patterned layer by removing an upper part of the covering film so that a top surface of the first patterned layer is exposed.

In the method of forming a patterned thin film of the invention, the step of forming the first patterned layer may include the steps of: forming a convex pattern layer that is made of the first material and has a shape greater than a desired shape of the first patterned layer; and making the convex pattern layer into the first patterned layer by removing part of the convex pattern layer.

In the method of forming a patterned thin film of the invention, the first material and/or the second material may be a resist.

A method of forming a magnetic pole of a thin-film magnetic head according to the invention is provided for forming a layer including a pole portion of a thin-film magnetic head, the thin-film magnetic head comprising: a medium facing surface that faces toward a recording medium; a first magnetic layer and a second magnetic layer magnetically coupled to each other and including pole portions that are opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers and insulated from the first and second magnetic layers. The method comprises the steps of: forming a convex first patterned layer made of a first material on a conductive base; forming a second patterned layer to be a frame on the base around the first patterned layer, the second patterned layer being made of a nonconductive second material that is different from the first material; making the second patterned layer into the frame by removing the first patterned layer, the frame having a groove formed by the removal of the first patterned layer; and forming a layer including one of the pole portions in the groove of the frame, the layer being made of a magnetic material.

According to the method of forming a magnetic pole of a thin-film magnetic head of the invention, it is possible to form the groove of the frame finely by forming the convex first patterned layer finely. The method therefore allows a fine formation of the layer including one of the pole portions in the groove.

In the method of forming a magnetic pole of a thin-film magnetic head of the invention, plating may be used in the step of forming the layer including one of the pole portions.

In the method of forming a magnetic pole of a thin-film magnetic head of the invention, the step of forming the second patterned layer may include the steps of: forming a covering film made of the second material so as to cover the first patterned layer; and making the covering film into the second patterned layer by removing an upper part of the covering film so that a top surface of the first patterned layer is exposed.

In the method of forming a magnetic pole of a thin-film magnetic head of the invention, the step of forming the first patterned layer may include the steps of: forming a convex pattern layer that is made of the first material and has a shape greater than a desired shape of the first patterned layer; and making the convex pattern layer into the first patterned layer by removing part of the convex pattern layer.

In the method of forming a magnetic pole of a thin-film magnetic head of the invention, the first material and/or the second material may be a resist.

In the method of forming a magnetic pole of a thin-film magnetic head of the invention, the layer including one of the pole portions may be a layer that defines a track width.

Other and further objects, features and advantages of the invention will appear more fully from the following description.

BRIEF DESCRIPTION OF THE DRAWINGS

FIG. 4A and FIG. 4B are cross sections for illustrating a step that follows FIG. 3A and FIG. 3B.

DETAILED DESCRIPTION OF THE PREFERRED EMBODIMENT

Hereinafter, an embodiment of the present invention will be described in detail with reference to the drawings.

Reference is now made to FIG. 1A to FIG. 4A and FIG. 1B to FIG. 4B to describe an example of a method of manufacturing a composite thin-film magnetic head, the method using the method of forming a patterned thin film and the method of forming a magnetic pole of a thin-film magnetic head according to the embodiment of the invention. FIG. 1A to FIG. 4A are cross sections each orthogonal to an air bearing surface. FIG. 1B to FIG. 4B are cross sections of the pole portions each parallel to the air bearing surface.

Figures 1A, 1B:
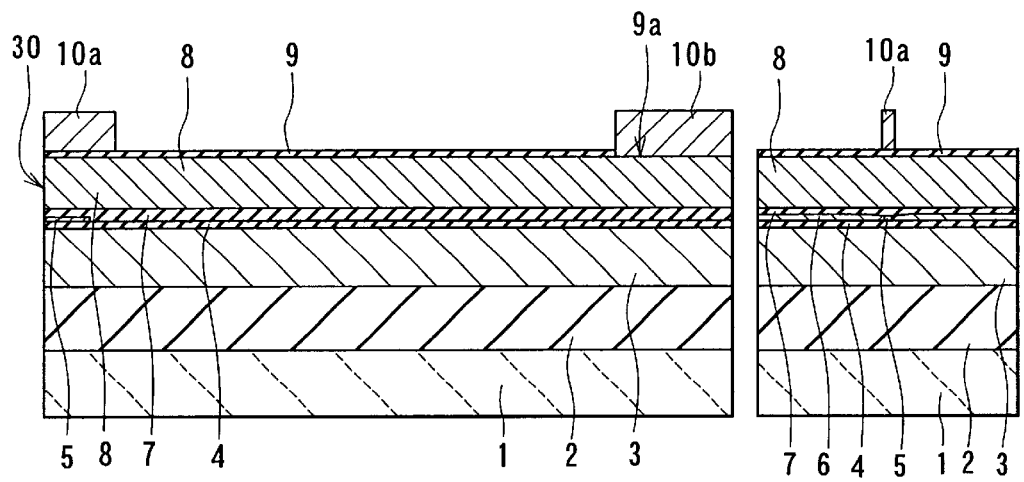
FIG. 1A and FIG. 1B are cross sections for illustrating an example of a method of manufacturing a composite thin-film magnetic head using a method of forming a patterned thin film and a method of forming a magnetic pole of a thin-film magnetic head according to an embodiment of the invention.

In the method of manufacturing a thin-film magnetic head of this example, as shown in FIG. 1A and FIG. 1B, an insulating layer 2 made of an insulating material such as alumina ($Al_2O_3$) or silicon dioxide ($SiO_2$) is formed through sputtering or the like, in a thickness of 1 to 20 μm, for example, on a substrate 1 made of a ceramic material such as aluminum oxide and titanium carbide ($Al_2O_3$—TiC). Then, a bottom shield layer 3 for making a read head, made of a magnetic material, is formed on the insulating layer 2 in a thickness of 0.1 to 5 μm, for example. Magnetic materials that may be used for the bottom shield layer 3 include FeAlSi, NiFe, CoFe, CoFeNi, FeN, FeZrN, FeTaN, CoZrNb, and CoZrTa. The bottom shield layer 3 is formed by sputtering, plating, or the like.

Next, a bottom shield gap film 4 made of an insulating material such as $Al_2O_3$ and $SiO_2$ is formed on the bottom shield layer 3, in a thickness of 10 to 200 nm, for example, through sputtering or the like. An MR element 5 for reading is formed on the bottom shield gap film 4, in a thickness of several tens of nanometers, for example, through sputtering or the like. The MR element 5 may be an element made of a magnetosensitive film that exhibits a magnetoresistive effect, such as an anisotropic magnetoresistive (AMR) element, a giant magnetoresistive (GMR) element, and a tunnel magnetoresistive (TMR) element.

On the bottom shield gap film 4, a pair of electrode layers 6 are formed through sputtering or the like in a thickness of several tens of nanometers. The electrode layers 6 are electrically connected to the MR element 5. A top shield gap film 7 made of an insulating material such as $Al_2O_3$ and $SiO_2$ is formed over the bottom shield gap film 4 and the MR element 5, in a thickness of 10 to 200 nm, for example, through sputtering or the like.

The foregoing layers that make up the read head are patterned by a typical etching method using a patterned resist layer, a lift-off method, or by a combination thereof.

On the top shield gap film 7, a top-shield-layer-cum-bottom-pole-layer (hereinafter referred to as bottom pole layer) 8 made of a magnetic material is formed in a thickness of 0.5 to 4.0 μm, for example. The bottom pole layer 8 is used for both a read head and a write head, and is made of a soft magnetic material such as NiFe, CoFe, CoFeNi, and FeN. The bottom pole layer 8 is formed through sputtering, plating, or the like.

Next, a write gap layer 9 made of an insulating material such as $Al_2O_3$ and $SiO_2$ is formed through sputtering or the like, in a thickness of 10 to 500 nm, for example, on the bottom pole layer 8. A portion of the write gap layer 9 located in a center portion of a thin-film coil to be described later is then etched off to form a contact hole 9a for making a magnetic path.

Next, a pole portion layer 10a including the pole portion of a top pole layer 10 is formed of a magnetic material for making a write head, on the write gap layer 9 in the vicinity of an air bearing surface 30. At the same time, a magnetic layer 10b of a magnetic material is formed on the contact hole 9a. The top pole layer 10 is made up of the pole portion layer 10a, the magnetic layer 10b, and a yoke portion layer 10c to be described later. The method of forming the pole portion layer 10a will be detailed later.

Figures 2A, 2B:
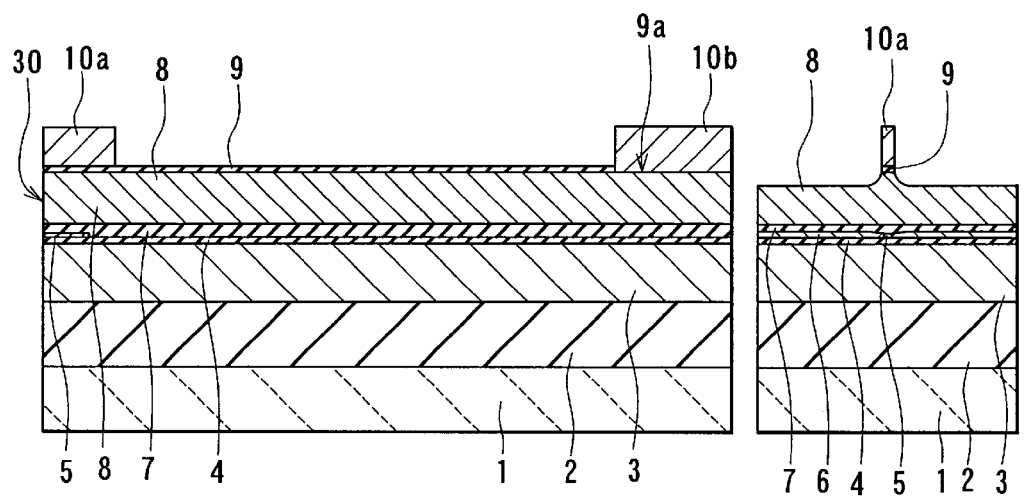
FIG. 2A and FIG. 2B are cross sections for illustrating a step that follows FIG. 1A and FIG. 1B.

Next, as shown in FIG. 2A and FIG. 2B, the write gap layer 9 and at least a part of the pole portion of the bottom pole layer 8 closer to the write gap layer 9 are etched around the pole portion layer 10a, using the pole portion layer 10a as a mask. For example, reactive ion etching (hereinafter referred to as RIE) is used for the etching of the write gap layer 9, and ion milling is used for the etching of the bottom pole layer 8. The structure in which the sidewalls of the pole portion (pole portion layer 10a) of the top pole layer 10, the write gap layer 9, and at least a part of the pole portion of the bottom pole layer 8 are formed vertically in a self-aligned manner as shown in FIG. 2B is called a trim structure.

Figures 3A, 3B:
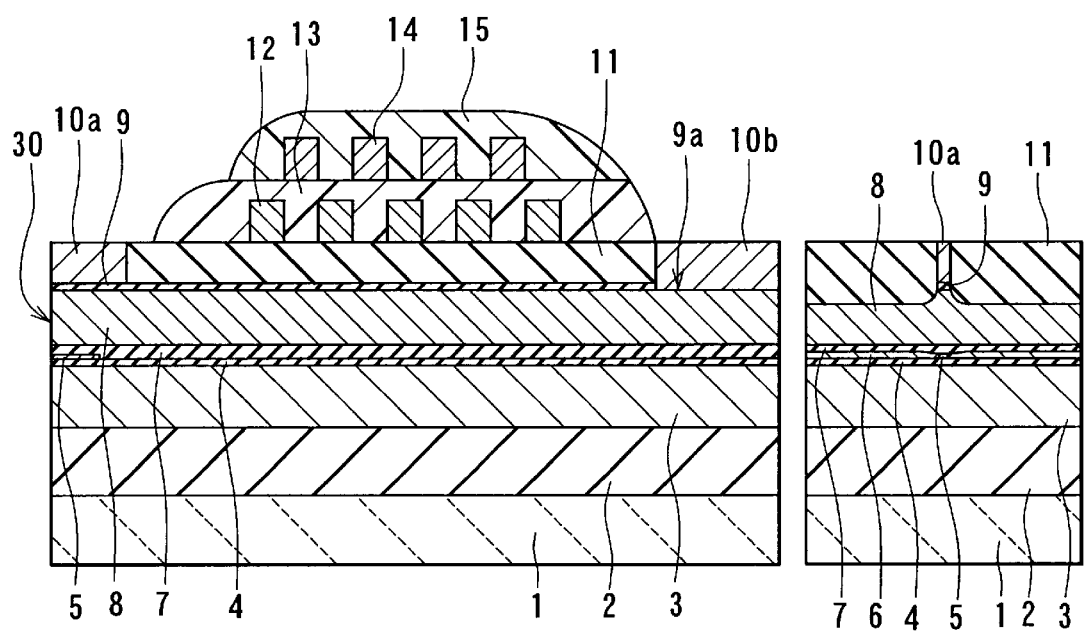
FIG. 3A and FIG. 3B are cross sections for illustrating a step that follows FIG. 2A and FIG. 2B.

Next, as shown in FIG. 3A and FIG. 3B, an insulating layer 11 made of an alumina film, for example, is formed over the pole portion layer 10a and the magnetic layer 10b so as to cover the entire surface. This insulating layer 11 is then polished through chemical mechanical polishing (CMP), for example, to the top surfaces of the pole portion layer 10a and the magnetic layer 10b, and the surface is flattened.

Next, a first layer 12 of the thin-film coil, made of copper (Cu), for example, is formed on the insulating layer 11 thus flattened. A photoresist layer 13 of a predetermined pattern is formed on the insulating layer 11 and the first layer 12 of the coil. The photoresist layer 13 is subjected to heat treatment at a predetermined temperature to flatten the surface thereof. A second layer 14 of the thin-film coil, made of copper (Cu), for example, is then formed on the photoresist layer 13. A photoresist layer 15 of a predetermined pattern is formed on the photoresist layer 13 and the second layer 14 of the coil. The photoresist layer 15 is subjected to heat treatment at a predetermined temperature to flatten the surface thereof.

Next, as shown in FIG. 4A and FIG. 4B, the yoke portion layer 10c that constitutes a yoke portion of the top pole layer 10 is formed over the pole portion layer 10a, the photoresist layers 13 and 15, and the magnetic layer 10b. The yoke portion layer 10c is made of a magnetic material intended for a write head, such as Permalloy. An end of the yoke portion layer 10c closer to the air bearing surface 30 is located away from the air bearing surface 30. The yoke portion layer 10c is connected to the bottom pole layer 8 through the magnetic layer 10b.

Next, an overcoat layer 17 made of alumina, for example, is formed on the yoke portion layer 10c. Finally, lapping of the slider including the foregoing layers is performed to form the air bearing surface 30 of a thin-film magnetic head that includes the write head and read head. The thin-film magnetic head is thereby completed.

The thin-film magnetic head of this example thus manufactured comprises the medium facing surface (the air bearing surface 30) that faces toward a recording medium, and the read and write heads. The read head has the MR element 5, and the bottom shield layer 3 and the top shield layer (bottom pole layer 8) for shielding the MR element 5. Portions of the bottom shield layer 3 and the top shield layer that are located on a side of the air bearing surface 30 are opposed to each other, the MR element 5 being placed between these portions.

The write head has the bottom pole layer 8, the top pole layer 10, the write gap layer 9, and the layers 12 and 14 of the thin-film coil. The bottom pole layer 8 and the top pole layer 10 are magnetically coupled to each other, and each include at least one layer. The pole layers 8 and 10 include the pole portions that are opposed to each other and placed in regions on a side of the air bearing surface 30. The write gap layer 14 is placed between the pole portions of the two pole layers 8 and 10. At least a part of the thin-film coil is placed between the two pole layers 8 and 10 and insulated from those pole layers. The pole portion of the top pole layer 10, that is, the pole portion layer 10a, defines the write track width.

In the present embodiment, the bottom pole layer 8 corresponds to the first magnetic layer of the invention, and the top pole layer 10 corresponds to the second magnetic layer of the invention.

Reference is now made to FIG. 5 to FIG. 13 to describe the method of forming a patterned thin film and the method of forming a magnetic pole of a thin-film magnetic head according to the embodiment that are used to form the pole portion layer 10a of the top pole layer 10. The following description includes a specific working example.

Figure 5:
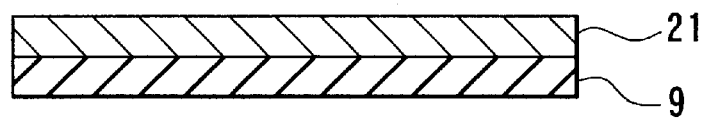
FIG. 5 is a cross section for illustrating the method of forming a patterned thin film and the method of forming a magnetic pole of a thin-film magnetic head according to the embodiment of the invention.

In this method, as shown in FIG. 5, an electrode film 21 for plating, made of a conductive material such as NiFe, is initially formed on the write gap layer 9. The electrode film 21 corresponds to the conductive base in the invention.

Figure 6:
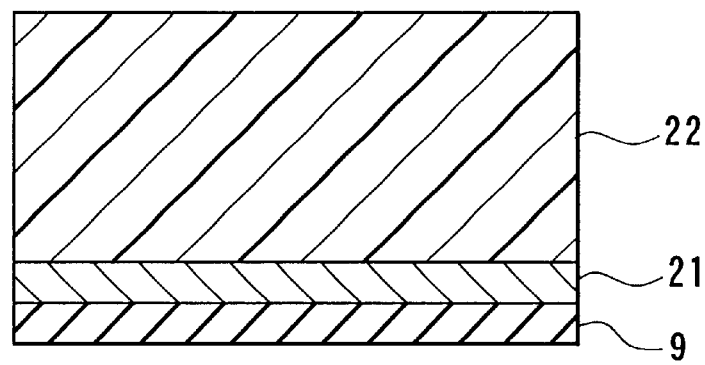
FIG. 6 is a cross section for illustrating a step that follows FIG. 5.

Then, as shown in FIG. 6, a film 22 to be patterned, is formed on the electrode film 21. The film 22 is made of a first material and used to form a first patterned layer 22B to be described later. The first material may be a resist. In the working example a novolac type i-ray positive resist, SIPR- 9281-4.0 (trade name) from Shin-Etsu Chemical Co., Ltd. was used as the first material, and this resist was applied onto the electrode film 21 in a thickness of approximately 4.0 µm, to form the film 22 to be patterned.

Figure 7:
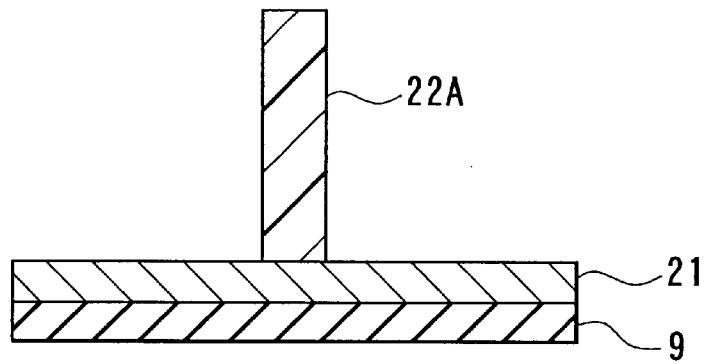
FIG. 7 is a cross section for illustrating a step that follows FIG. 6.

Then, the film 22 is exposed to light under a mask. After the exposure, the film 22 is developed and the exposed portions of the film is removed. An isolated convex pattern layer 22A is thereby formed as shown in FIG. 7. The convex pattern layer 22A has a shape greater than a desired shape of the first patterned layer 22B. In the working example, the convex pattern layer 22A was formed to have a width of approximately 0.4 µm.

Figure 8:
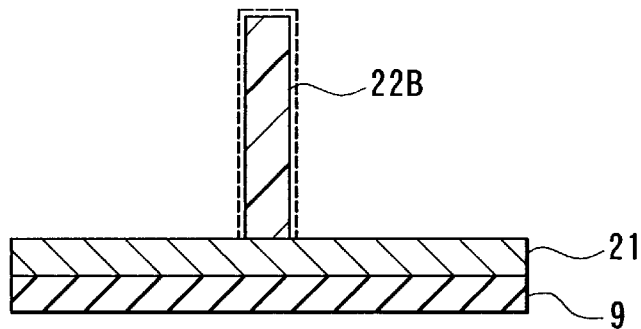
FIG. 8 is a cross section for illustrating a step that follows FIG. 7.

Next, as shown in FIG. 8, the convex pattern layer 22A is partially removed by ashing or the like so that the convex pattern layer 22A is reduced in width and trimmed in shape. The convex pattern layer 22A after the partial removal serves as the first patterned layer 22B. In the working example an asher (ashing system) was used to ash lightly, so that traces of the resist on the electrode film 21 and portions of the surfaces of the convex pattern layer 22A were removed. The first patterned layer 22B was thereby formed to have a width of approximately 0.3 µm.

Figure 9:
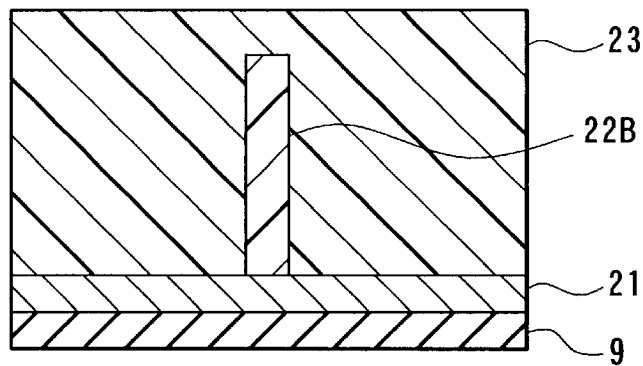
FIG. 9 is a cross section for illustrating a step that follows FIG. 8.

Next, as shown in FIG. 9, a covering film 23 is formed to cover the first patterned layer 22B. The covering film 23 is made of a nonconductive second material that is different from the first material and immiscible with the first material. The second material may be a resist. In the working example, a rubber type negative resist, CIR 701 (trade name) from JSR corporation was used as the second material. This resist was dropped onto the electrode film 21 and the first patterned layer 22B to form the covering film 23. Further, in the working example, in order to enhance the bonding of the negative resist used for the covering film 23 the entire surface of the covering film 23 was exposed to light without a mask so as to crosslink the negative resist.

Figure 10:
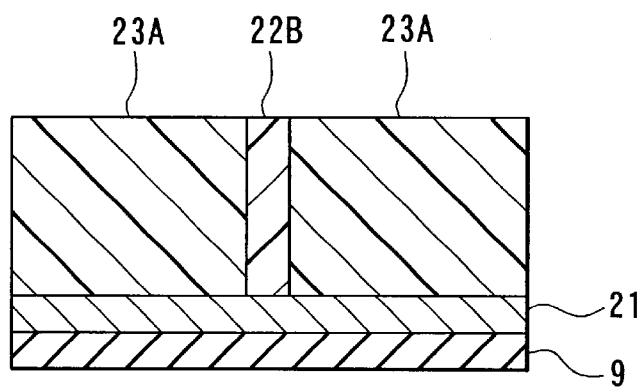
FIG. 10 is a cross section for illustrating a step that follows FIG. 9.

Next, as shown in FIG. 10, an upper part of the covering film 23 is removed so that the top surface of the first patterned layer 22B is exposed. The covering film 23 after the removal of the upper part thereof serves as a second patterned layer 23A. The removal of the upper part of the covering film 23 may be performed by ashing, etching such as ion milling and RIE, mechanical polishing, and the like. In the working example, the upper part of the covering film 23 was removed by ashing with an asher, and the top surface of the first patterned layer 22B was thereby exposed. In this way, the second patterned layer 23A to be a frame, made of the nonconductive second material different from the first material, is formed on the electrode film 21 around the first patterned layer 22B.

Figure 11:
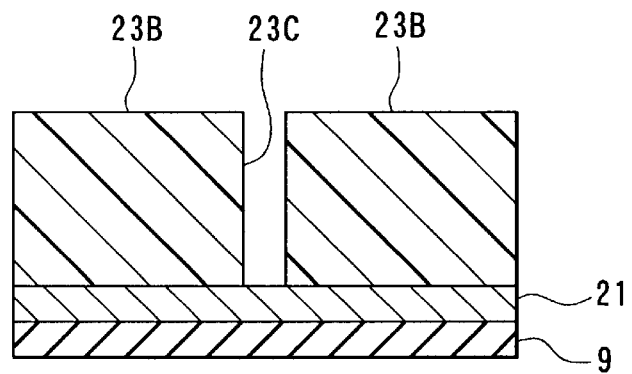
FIG. 11 is a cross section for illustrating a step that follows FIG. 10.

Next, as shown in FIG. 11, the first patterned layer 22B is removed, so that the second patterned layer 23A is made into a frame 23B. The frame 23B has a groove 23C formed by the removal of the first patterned layer 22B. In the working example, the laminate having the layers up to the second patterned layer 23A on the substrate was fixed to the spin chuck of a developer. The laminate was spun by the spin chuck while aceton was dropped thereon from above to dissolve and remove the first patterned layer 22B made of the i-ray positive resist SIPR-9281-4.0 (trade name). As a result, the frame 23B having the groove 23C of approximately 0.3 µm in width and 3.8 µm in depth was formed.

Figure 12:
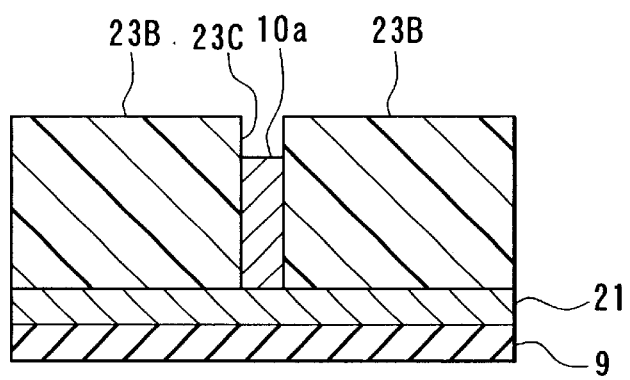
FIG. 12 is a cross section for illustrating a step that follows FIG. 11.

Next, as shown in FIG. 12, the pole portion layer 10a made of a magnetic material such as NiFe is formed inside the groove 23C of the frame 23B by plating. The pole portion layer 10a corresponds to the patterned thin film of the present invention. In the working example, the pole portion layer 10a was formed to have a height of approximately 3.5 µm.

Figure 13:
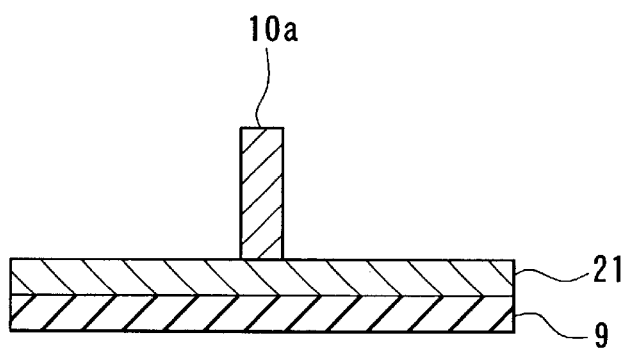
FIG. 13 is a cross section for illustrating a step that follows FIG. 12.

Then, as shown in FIG. 13, the frame 23B is removed off. In working the example, removing agent 502A (trade name) from Tokyo Ohka Kogyo Co., Ltd. was used to remove the frame 23B made of the negative resist CIR 701 (trade name). As a result, the pole portion layer 10a of approximately 0.3 µm in width and 3.5 µm in height was obtained.

As described above, the method of forming a patterned thin film and the method of forming a magnetic pole of a thin-film magnetic head according to the present embodiment comprise the steps of: forming the convex first patterned layer 22B of the first material on the electrode film 21 that serves as a conductive base; forming the second patterned layer 23A to be the frame, made of the nonconductive second material different from the first material, on the electrode film 21 around the first patterned layer 22B; making the second patterned layer 23A into the frame 23B by removing the first patterned layer 22B, the frame having the groove 23C formed by the removal of the first patterned layer 22B; and forming the patterned thin film (pole portion layer 10a) in the groove 23C of the frame 23B.

According to the present embodiment, it is possible to form the first patterned layer 22B finer than the dimensions determined by optical limitations, by using a resist as the first material and by removing part of the convex pattern layer 22A by ashing or the like to form the first patterned layer 22B. Consequently, through the use of the frame 23B, it is possible to form the patterned thin film (pole portion layer 10a) finer than the dimensions determined by optical limitations.

In the present embodiment, the frame 23B is made of a nonconductive material. This precludes the formation of plating films on the frame 23B when the patterned thin film (pole portion layer 10a) is formed by plating. Therefore, according to the present embodiment, even when the patterned thin film (pole portion layer 10a) is formed by plating, it is not necessary to use a frame of two-layered structure. The present embodiment therefore makes it possible to form a finer patterned thin film (pole portion layer 10a) while reducing the number of steps and the manufacturing cost.

In the present embodiment, the method of forming a magnetic pole of a thin-film magnetic head described above is used to form the pole portion layer 10a including the pole portion that defines the track width. It is therefore possible to implement a thin-film magnetic head having a smaller write track width.

The present invention is not limited to the foregoing embodiment but is susceptible of various modifications. For example, while the embodiment has dealt with the case where the patterned thin film (pole portion layer 10a) is formed by plating, the patterned thin film (pole portion layer 10a), if somewhat greater in width, may be formed by other methods such as sputtering.

The method of forming a patterned thin film of the present invention is not limited to the formation of the pole portion layer 10a that defines the write track width of the thin-film magnetic head, but is also applicable to the formation of the magnetic layer 10b, the yoke portion layer 10c, and the bottom pole layer 8. The method of forming a patterned thin film of the present invention may also be applied to the formation of the top pole layer if the top pole layer is made up of a single layer. Furthermore, the method of forming a patterned thin film of the present invention is not limited to the formation of pole layers of a thin-film magnetic head, but is applicable to the formation of various other patterned thin films.

The foregoing embodiment has dealt with a thin-film magnetic head in which the MR element for reading is formed on the base body and the induction-type electromagnetic transducer for writing is stacked thereon. However, this stacking order may be inverted.

More specifically, the induction-type electromagnetic transducer for writing may be formed on the base body and the MR element for reading may be stacked thereon. Such a structure may be realized, for example, by forming a magnetic film having the function of the top pole layer of the foregoing embodiment onto the base body as a bottom pole layer, and forming a magnetic film having the function of the bottom pole layer of the foregoing embodiment as a top pole layer so that the pole layers are opposed to each other with a write gap film in between.

Moreover, the present invention may also be applied to a thin-film magnetic head dedicated to writing that has an induction-type electromagnetic transducer alone, and a thin-film magnetic head that performs writing and reading with an induction-type electromagnetic transducer.

As has been described, according to the method of forming a patterned thin film of the present invention, it is possible to form the groove of the frame finely by forming the convex first patterned layer finely. It is therefore possible, according to the invention, to form a patterned thin film finer than the dimensions determined by optical limitations. Moreover, in the present invention the frame is made of a nonconductive material. Therefore, according to the invention, even when the patterned thin film is formed by plating, it is not necessary to use a frame of two-layered structure and consequently, it is possible to form a finer patterned thin film while reducing the number of steps required.

According to the method of forming a magnetic pole of a thin-film magnetic head of the present invention, it is possible to form the groove of the frame finely by forming the convex first patterned layer finely. It is therefore possible, according to the invention, to form a magnetic pole finer than the dimensions determined by optical limitations. Moreover, in the present invention the frame is made of a nonconductive material. Therefore, even when the layer including one of the pole portions is formed by plating, it is not necessary to use a frame of two-layered structure and consequently, it is possible to form a finer magnetic pole while reducing the number of steps required.

In the method of forming a magnetic pole of a thin-film magnetic head of the invention, the layer including one of the pole portions may be a layer that defines a track width. In this case, it is possible to implement a thin-film magnetic head having a smaller track width.

Obviously many modifications and variations of the present invention are possible in the light of the above teachings. It is therefore to be understood that within the scope of the appended claims the invention may be practiced otherwise than as specifically described.

What is claimed is:

1. A method of forming a patterned thin film by using a frame, comprising the steps of:
   forming a convex first patterned layer made of a first material on a conductive base;
   forming a second patterned layer to be a frame on the base around the first patterned layer, the second patterned layer being made of a nonconductive second material that is different from the first material;
   making the second patterned layer into the frame by removing the first patterned layer, the frame having a groove formed by the removal of the first patterned layer; and
   forming a patterned thin film in the groove of the frame.

2. The method according to claim 1, wherein plating is used in the step of forming the patterned thin film.

3. The method according to claim 1, wherein the step of forming the second patterned layer includes the steps of: forming a covering film made of the second material so as to cover the first patterned layer; and making the covering film into the second patterned layer by removing an upper part of the covering film so that a top surface of the first patterned layer is exposed.

4. The method according to claim 1, wherein the step of forming the first patterned layer includes the steps of: forming a convex pattern layer that is made of the first material and has a shape greater than a desired shape of the first patterned layer; and making the convex pattern layer into the first patterned layer by removing part of the convex pattern layer.

5. The method according to claim 1, wherein the first material is a resist.

6. The method according to claim 1, wherein the second material is a resist.

7. A method of forming a magnetic pole of a thin-film magnetic he ad for forming a layer including a pole portion of a thin-film magnetic head, the thin-film magnetic head comprising: a medium facing surface that faces toward a recording medium; a first magnetic layer and a second magnetic layer magnetically coupled to each other and including pole portions that are opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers and insulated from the first and second magnetic layers, the method comprising the steps of:
   forming a convex first patterned layer made of a first material on a conductive base;
   forming a second patterned layer to be a frame on the base around the first patterned layer, the second patterned layer being made of a nonconductive second material that is different from the first material;
   making the second patterned layer into a frame by removing the first patterned layer, the frame having a groove formed by the removal of the first patterned layer; and
   forming a layer including one of the pole portions in the groove of the frame, the layer being made of a magnetic material.

8. The method according to claim 7, wherein plating is used in the step of forming the layer including one of the pole portions.

9. The method according to claim 7, wherein the step of forming the second patterned layer includes the steps of: forming a covering film made of the second material so as to cover the first patterned layer; and making the covering film into the second patterned layer by removing an upper part of the covering film so that a top surface of the first patterned layer is exposed.

10. The method according to claim 7, wherein the step of forming the first patterned layer includes the steps of: forming a convex pattern layer that is made of the first material and has a shape greater than a desired shape of the first patterned layer; and making the convex pattern layer into the first patterned layer by removing part of the convex pattern layer.

11. The method according to claim 7, wherein the first material is a resist.

12. The method according to claim 7, wherein the second material is a resist.

13. The method according to claim 7, wherein the layer including one of the pole portions is a layer that defines a track width.

* * * * *